United States Patent [19]
Battigelli

[11] 3,819,345
[45] June 25, 1974

[54] PRODUCTION OF FIBERS FROM THERMOPLASTIC MATERIALS, PARTICULARLY GLASS FIBERS

[75] Inventor: Jean Battigelli, Rantigny, France

[73] Assignee: Saint-Gobain, Neuilly-sur-Seine, France

[22] Filed: Mar. 29, 1972

[21] Appl. No.: 239,250

[30] Foreign Application Priority Data
Apr. 7, 1971    France ............................. 71.12223

[52] U.S. Cl. .............................. 65/6, 65/14, 264/8, 425/7
[51] Int. Cl. .......................................... C03b 37/04
[58] Field of Search ............... 65/4, 5, 6, 12, 15, 16; 264/8; 425/7

[56]         References Cited
         UNITED STATES PATENTS
3,265,477   8/1966   McCoppin ........................... 65/6 X
3,304,164   2/1967   Charpentier et al. ................ 65/15 X
3,523,774   8/1970   Kleist ..................................... 65/14

FOREIGN PATENTS OR APPLICATIONS
245,466   3/1963   Australia .................................... 65/5
641,809   5/1962   Canada ....................................... 65/6
641,831   5/1962   Canada ....................................... 65/6
661,345   4/1963   Canada ...................................... 65/14

Primary Examiner—Robert L. Lindsay, Jr.
Attorney, Agent, or Firm—Samuel Lebowitz

[57]           ABSTRACT

The production of fibers from thermoplastic materials, particularly glass fibers, by feeding a molten stream of the material into the interior of a hollow centrifuge body of enlarged diameter rotating rapidly around a vertical axis, which body is provided with a peripheral wall of substantial height which is pierced with a large number of rows of orifices through which the molten material is projected by centrifugal force in the form of filaments, which are then attenuated into fibrous form by hot gaseous blasts acting in a direction transverse to the planes of emission of the filaments. The deformation of the centrifuge body is reduced and its operating life is extended by critically controlling the temperature of the molten material which is projected through the orifices by first directing the incoming stream of molten material onto an annular supporting element or flange which is integral with the lower edge of said peripheral wall and extending inwardly therefrom, wherefrom the molten material is distributed in an upward direction along the interior face of said peripheral wall in position to be projected through the orifices therein. The introduction of the molten material upwardly from the annular flange or support element enables the accurate control of the temperature of the molten material by heating the latter or the support element so that the temperature of the peripheral wall is substantially constant along the entire height thereof, resulting in the production of fibers of uniform characteristics.

27 Claims, 6 Drawing Figures

PATENTED JUN 25 1974            3,819,345

PRODUCTION OF FIBERS FROM THERMOPLASTIC MATERIALS, PARTICULARLY GLASS FIBERS

The present invention relates to the production of fibers from thermoplastic materials in the viscous state, and particularly glass fibers.

Already known is the use of a hollow body, provided with a plurality of rows of orifices on its periphery, into which body is fed the molten material. This hollow body or centrifuge is rotated at high speed around its axis, to cause the molten material to be projected by centrifugal force through the orifices in the peripheral wall, in the form of filaments, which are then subjected to attenuation by a gaseous blast which transforms them into fibers.

The invention relates more particularly to devices of this type designed for a large number of production cycles and high outputs, and which, for this purpose, comprise a large number of rows of orifices, with each row itself having a large number of orifices. In order to attain a high production capacity, use is made by peripheral bands or walls of ten or more rows of orifices, the diameter of which may reach or exceed 400 mm.

It is known in the industrial application of the above-mentioned centrifuge devices, that the greater the diameter of the rotary centrifuge body, the greater is its tendency to deformation, with the consequent decrease in its operational time. It is the object of the invention to increase substantially the durability and longevity of such rotary centrifuge devices which have a large number of orifices and which are of large diameter and height.

According to the invention, the molten material is projected by centrifuging to flow in its entirety along the radial dimension of an annular support element which is integral with the lower part of the peripheral band or wall of the hollow body. The temperature of the support element is maintained or raised, by localized heating in the metal of said element, to a value near that of the wall and with a low temperature gradient, in order that the molten material reach the lower part of the peripheral band with the last rows of orifices therein, before extending along the entire height of the band. The filaments projected through the assembly or multiplicity of orifices in the band are then subjected to the action of gaseous currents to effect their attenuation. This procedure makes possible the attainment of a substantially constant temperature along the support element and the peripheral wall, which results in the tremendously improved mechanical behavior of the centrifuge body. In addition, by arranging that the molten material be introduced at the lower part of the peripheral wall, the temperature of this part, which normally is lower than that of the upper part, is raised, which serves to render uniform the temperature of the wall without need for extraneous means, such as high frequency heating, to heat it.

According to one embodiment of the invention, the support element is of annular outline, the width of which does not exceed a fourth of the diameter of the hollow rotating body, and the temperature gradient over the entire width of this element is lower than 15°C. per cm.

According to one mode of executing the invention, the molten material, fed in the form of a stream or thread, is directed into contact with a first centrifuge element which projects it centrifugally in a subdivided state, in order to cause it to flow over the support element before reaching the inner wall of the lower part of the peripheral wall of the centrifuge body, adjacent to the last rows of orifices.

According to another mode of operation, the molten material, conducted in the form of a stream which is displaced with respect to the axis of rotation of the rotating body, is projected by centrifuging, into contact with an annular neck or channel bearing or constituting said support element, at the lower part of the inner wall of the peripheral band of the centrifuge body, adjacent to the last rows of orifices. According to this arrangement, the displacement of the stream of material from the axis of the centrifuge is greater than a quarter of the diameter of the latter; the temperature of the support element, between the stream and the lower part of the peripheral wall is maintained at a temperature close to that of the latter; and the temperature gradient of this element is lower than 15°C. per cm., and preferably around 5°C. per cm.

As described above, the invention makes possible the maintenance of the peripheral wall at a temperature substantially constant over its entire height. However, the gases which serve to attenuate the filaments which are discharged through the orifices have a temperature which decreases from the points of emission from their combustion chamber discharge slot, this decrease in temperature causing especially the obtention of fibers of different diameters. Therefore, it is another characteristic of the invention to compensate for this decrease in temperature of the gaseous attenuating currents as they travel toward the base of the centrifuge body, by having the diameters of the orifices of the peripheral wall decrease from the upper to the lower parts of the latter, so that the molten material is projected through orifices of smaller diameter in the lower part of the wall.

The temperature of the support element can be maintained at the desired value solely by application of the necessary heat into contact with the molten material. This temperature may be raised by means of induced currents, which are preferably localized in said support.

The molten material presented to the lower part of the peripheral wall spreads into a layer over the height of the latter, which decreases in thickness towards the top of the wall, with a consequent decrease in pressure on the material which is projected through the orifices thereat.

It is another characteristic of the invention to obtain a layer of substantially uniform thickness over the whole height of the peripheral wall, by providing a reserve of material which completely fills a space defined by said peripheral wall and a coaxial inner wall to form said uniform layer over the entire height of the inner surface of the peripheral wall. According to the invention, the molten material, which flows along the support element, reaches the lower part of the peripheral wall adjacent to the last rows of orifices, through a passage left free at the lower part of the inner coaxial wall, before filling the entire space formed by said outer peripheral wall and inner wall. Advantageously, an insulating packing, particularly a refractory lining, may be positioned against the inner annular wall.

The invention also contemplates the positioning of an annular screen around the peripheral wall coaxially with the centrifuge body, the upper part of which is substantially at the level of the upper row of orifices in the peripheral wall. This screen prevents the dilution of the attenuating blast of gases by induction of extraneous gaseous currents, and serves to maintain the speed of said gases substantially constant, with a consequent uniform action on the filaments issuing from the orifices of the peripheral wall.

Other characteristics and advantages of the invention will appear from the following description thereof in conjunction with the several illustrative embodiments thereof which are shown in the accompanying drawings and wherein FIG. 1 is a vertical sectional view of a preferred embodiment of the invention;

Figure 1:
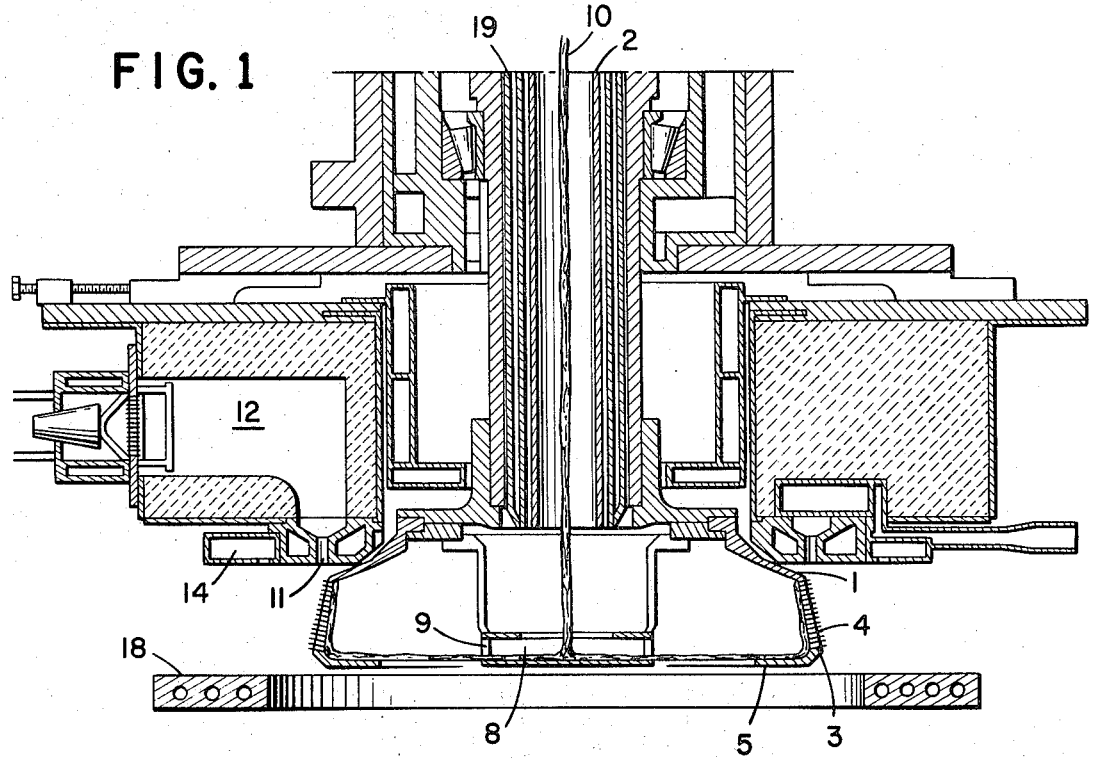

As shown in the attached drawings, the apparatus for the production of fibers comprises a rotating body 1 which is mounted on a hollow shaft 2 adapted to operate at high speed. This body 1 has a peripheral band or wall 3 of substantial height in which are provided a plurality of orifices 4 through which are projected the molten thermoplastic material. A support element 5 is fixed upon the rotating body, this element being constituted by an annular flange extending substantially perpendicularly to the axis of rotation of the assembly.

In the embodiment shown in FIG. 1, a basket or tray 8 with orifices 9 on its periphery, is disposed integrally and coaxially with the hollow body. The thermoplastic material 10 in the molten state, is introduced along the axis of the hollow shaft 2 and drops into basket 8, from which it is projected by the action of centrifugal force through orifices 9, to spread over the surface of the support element 5. The material then reaches the lower part of the peripheral wall 3 and spreads over its entire height to be projected in the form of threads or filaments through the orifices 4. Preferably, the annular flange 5 is formed of the same metal as the peripheral wall and its width does not exceed one-fourth the diameter of the latter.

The temperature of the support element or flange 5 may be brought to the desired degree, close to that of the peripheral wall, through application of the necessary heat into contact with the molten material. The temperature of the flange 5 may be maintained or increased by means of induced currents adapted to be developed in the latter. For this purpose, an induction coil 18 may be used, the spirals of which are arranged in a plane perpendicular to the rotary axis of the rotating body. This induction coil is located below the level of the flange. According to a preferred method of operation, this coil may be supplied with currents of medium frequency, such as 6 to 20 kc. or more. High frequency currents, for example, of 100 to 300 kc., may also be used.

The filaments of material projected beyond the rotating body are subjected to the action of combustion gases discharging at great speed and high temperature from the annular slot or expansion orifices 11 of an annular combustion chamber 12, arranged coaxially with the rotating body 1. These combustion gases serve to attenuate the filaments of molten material into fine fibers. A complementary action on the filaments may be obtained by means of an annular jet, particularly of hot air or steam, discharging from an annular blower 14 disposed beyond the blower slot 11 of the combustion chamber.

An internal burner 19, disposed concentrically with respect to the molten stream 10 permits the centrifuge body to be brought to a suitable temperature, before the introduction of the molten material, which may be of suitable vitreous composition, this temperature then being maintained by the molten glass itself.

The diameters of the orifices 4 in the peripheral wall 3 may decrease in size from the upper part of the wall to the lower part thereof, thereby compensating for the reduction in temperature of the attenuating gases acting on the filaments issuing from the lower rows of orifices.

Figure 2:
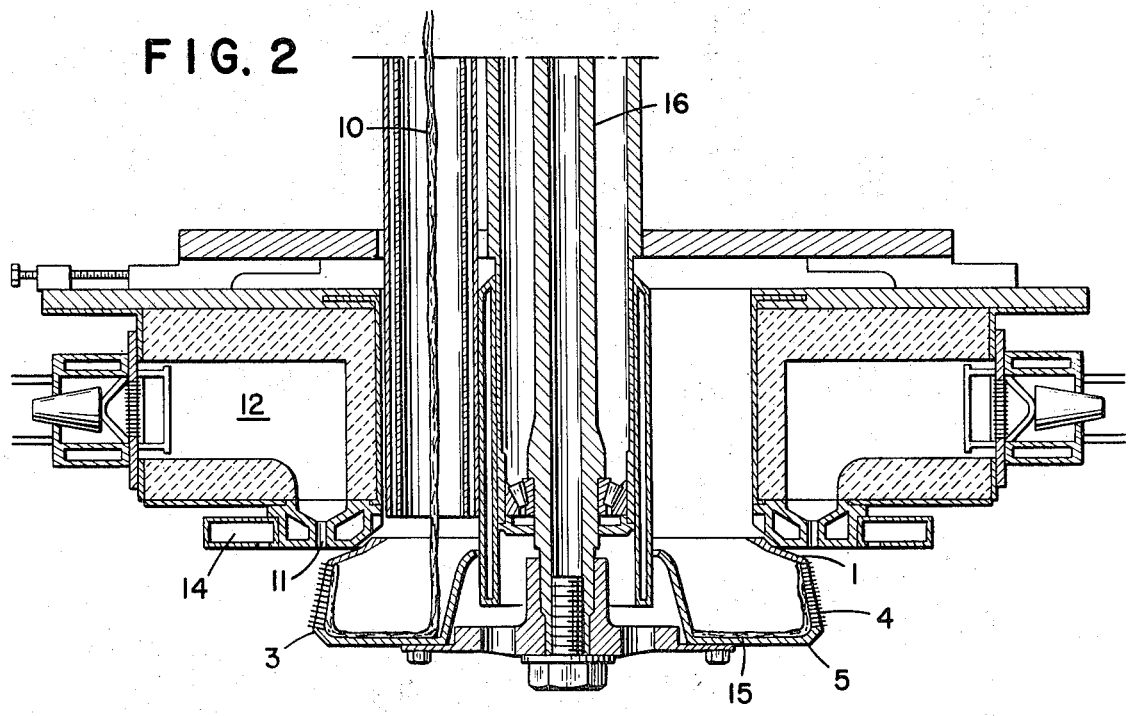
FIG. 2 is a vertical sectional view of a variant embodiment of the invention wherein the molten material is supplied to the centrifuge in a stream displaced from the axis of the latter.
Figure 3:
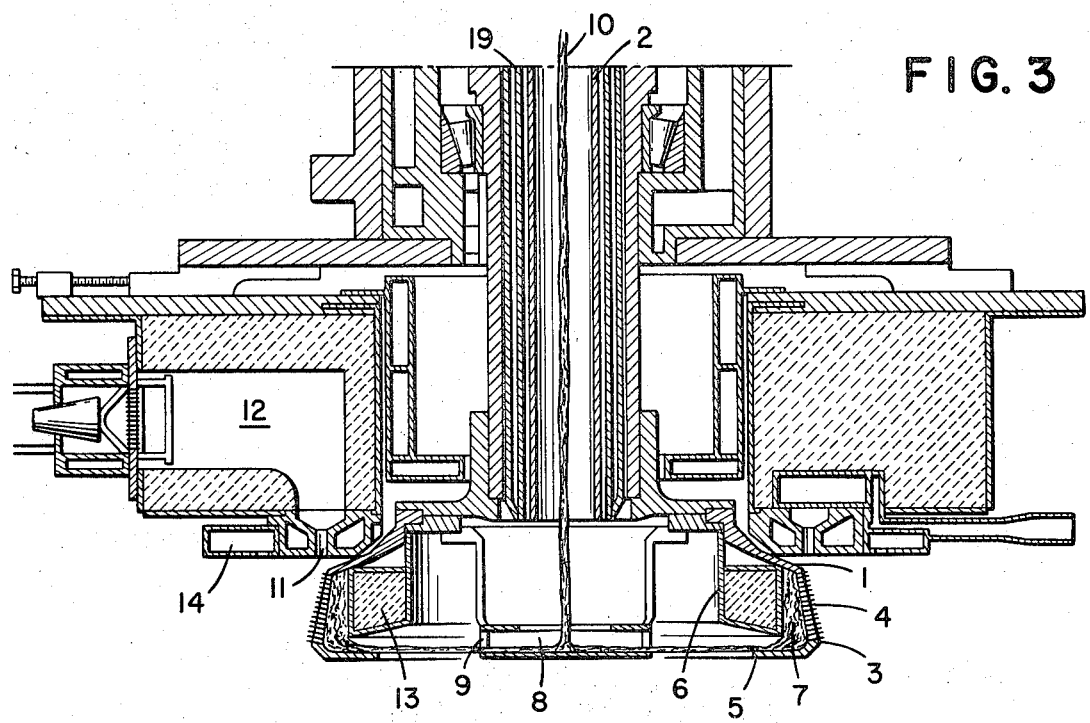
FIG. 3 is a vertical sectional view of a variation of the embodiment shown in FIG. 1, which provides a substantially uniform layer of molten material for projection through the orifices in the peripheral wall of the centrifuge.
Figure 4:
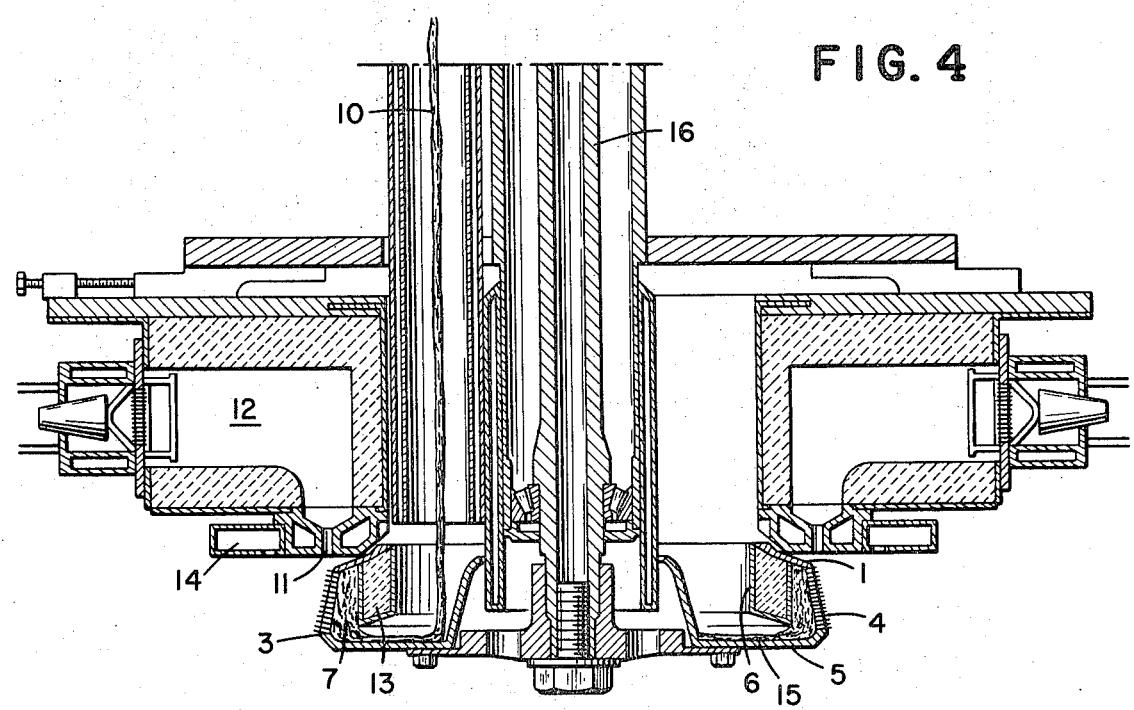
FIG. 4 illustrates a variant of the embodiment shown in FIG. 2 to attain a substantially uniform layer of material at the inner surface of the peripheral wall.

In the embodiment shown in FIG. 2, the stream of molten thermoplastic material is displaced with respect to the rotary axis of the rotating body 1 and falls into an annular trough or channel 15 which is integrally connected with the drive shaft 16 and support element or flange 5. The molten material is projected from this trough onto flange 5 wherefrom it reaches the lower part of the peripheral wall and spreads out over the entire height of the internal surface of the latter.

The embodiments of the invention shown in FIGS. 3 to 6 provide for the establishment of a reserve supply of molten material over the entire height of the internal surface of the peripheral wall. This reserve supply is accumulated in an annular chamber 7 whose inner wall is constituted by a partition 6. This partition may include an annular block of heat insulating material 13, for example, a packing of a refractory composition. The molten material which spreads out over the surface of flange 5 passes between the lower part of wall 3 and partition 6 to completely fill the chamber 7. Preferably, the height of the annular free space formed at the lower part between partition 6 and the peripheral wall is of the order of 5mm. to 10mm. Thus, there is assured a constant and identical pressure on the molten material behind all the projection orifices 4 of the peripheral wall, which results in the uniformity of the filaments of the projected material, whatever the level of the orifices from which they are projected.

Figure 5:
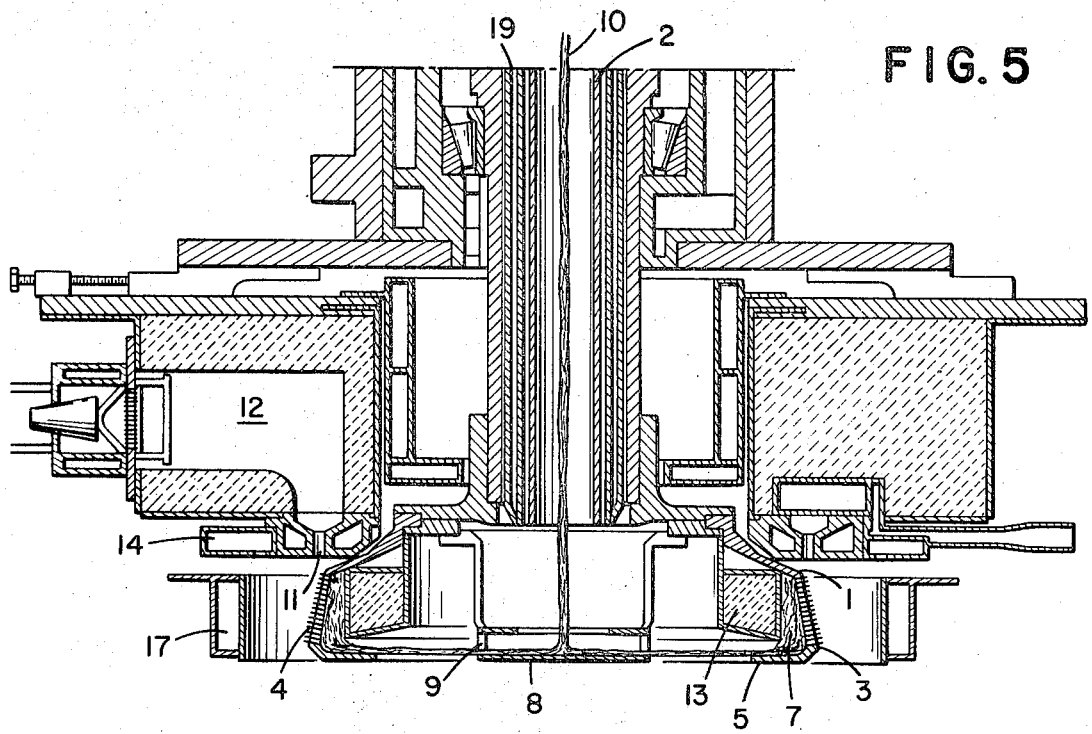
FIG. 5 is a vertical sectional view of still another embodiment of the invention resembling that shown in FIG. 3, and which includes an annular screen surrounding the centrifuge.

In FIG. 5 is shown an annular screen 17 arranged coaxially with the rotating body and below the combustion chamber 12. This screen is disposed beyond the discharge slot 11 from which are discharged the hot attenuating gases issuing from this chamber, and, also beyond the annular jet of hot air or steam issuing from blower 14. The upper part of this screen is positioned at about the level of the upper row of orifices 4 of the peripheral wall. This screen serves at the same time to attain maximum efficiency for the blower which effects the attenuation of the fibers, and facilitates, as well, the evacuation of the fibers. These improved results may be attributed to the exclusion of any interfering or extraneous air currents from the field of operation of the attenuating blast. As shown in FIG. 5, this screen is hollow and if desired, cooling fluids may be circulated therethrough.

Figure 6:
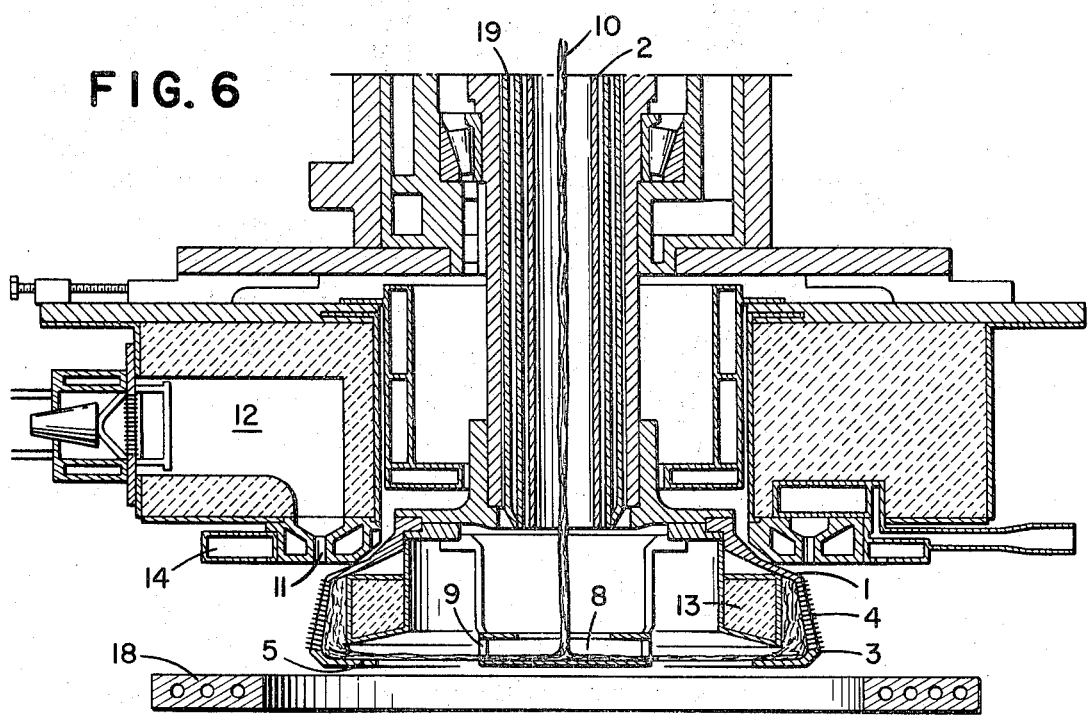
FIG. 6 is a vertical sectional view of a variant embodiment of the invention shown in FIG. 3, with the inclusion of a heating element to attain localized heating effects.

FIG. 6 shows the addition of an induction coil 18 to maintain or increase the temperature of the supporting flange 5, this arrangement being similar to that shown in FIG. 1.

I claim:

1. The method of producing fibers from molten thermoplastic material by projecting by centrifugal force, the molten material which is fed to the interior of a rapidly rotating hollow body having an annular surface at the lower end thereof, through a large number of rows of orifices in the high peripheral wall of said body, and thereafter attenuating the filaments projected from said orifices, which comprises
   a. dropping a stream of the molten material to the lower end of said hollow body,
   b. causing the molten material within the hollow body to flow laterally on said annular surface at said lower end by centrifugal force, towards the lower part of the peripheral wall in the shape of a thin sheet, preparatory to the travel of the material upwardly adjacent to the inner surface of said peripheral wall with the orifices therein, to scatter the molten material therearound,
   c. maintaining the temperature of said annular surface close to the temperature of said peripheral wall, with a permissible low temperature gradient in said annular surface in the radial direction, so that the temperature of the thermoplastic material when it reaches said inner surface is sufficiently high for projection through the orifices therein, and
   d. distributing the material upwardly therefrom along the entire height of the peripheral wall to present a layer of the material behind all the orifices therein at a substantially uniform temperature for projection by centrifugal force through said orifices.

2. The method set forth in claim 1, wherein said temperature gradient is lower than 15°C. per cm. from the inner edge of said surface to said peripheral wall.

3. The method set forth in claim 2, wherein the diminishing temperature gradient is approximately 5°C. per cm.

4. The method set forth in claim 1, wherein the stream of molten material is dropped into said hollow body along the rotary axis thereof onto a distributing member, wherefrom it is projected by centrifugal force onto said annular surface.

5. The method set forth in claim 1, wherein the stream of molten material is dropped into said hollow body at a point displaced from the rotary axis thereof and adjacent to the inner boundry of said annular surface.

6. The method set forth in claim 4, including the step of inductively heating the molten material in the course of its lateral flow on said annular surface towards the bottom edge of the internal surface of said lateral wall.

7. The method set forth in claim 5, wherein the displacement of the dropping stream of molten material from the rotary axis of the hollow body is greater than one-fourth the diameter of the latter.

8. The method set forth in claim 1, including the step of heating the molten material in the course of its travel to the lower end of said hollow body by applying heat directly to the stream of molten material.

9. The method set forth in claim 1, wherein the layer of material distributed upwardly along the entire height of the peripheral wall diminishes in depth from the lower to the upper part of said layer.

10. The method set forth in claim 1, wherein the layer of material distributed upwardly along the entire height of the peripheral wall is of substantially uniform depth to subject the molten material adapted to be discharged from the orifices to substantially the same pressure.

11. The method set forth in claim 1, wherein the molten thermoplastic material is a vitreous composition for the production of glass fibers.

12. An apparatus for the production of fine fibers from molten thermoplastic material, particularly molten glass, which comprises
   a. a hollow centrifuge rotatable about a vertical axis and having a peripheral wall of substantial height provided with a large number of superposed rows of orifices therein through which are adapted to be projected filaments by centrifugal force, with an annular metallic reenforcing support extending inwardly from the lower end of said peripheral wall,
   b. a hollow rotary shaft supporting said centrifuge at the lower end thereof,
   c. means for rapidly rotating said shaft and centrifuge,
   d. an annular combustion chamber above said rotary centrifuge and fitted with an annularly-shaped blower slot immediately beyond said peripheral wall to direct downwardly combustion gases at high temperature and velocity beyond said peripheral wall for attenuating said filaments into thin fibers,
   e. means for feeding a stream of the molten material to the interior of said centrifuge and directing it laterally by centrifugal force onto said annular support towards the lower edge of the internal surface of said peripheral wall, wherefrom it spreads upwardly to present a layer of the material behind all the orifices therein at a substantially uniform temperature for projection by centrifugal force through said orifices, and
   f. heating means for said molten material to maintain the temperature thereof substantially constant at all the superposed rows of orifices.

13. An apparatus as set forth in claim 12, wherein said annular support is formed of the same metal as that of said peripheral wall.

14. An apparatus as set forth in claim 12, wherein said annular metallic support is of a radial width which is less than one-fourth the diameter of said peripheral wall.

15. An apparatus as set forth in claim 12, wherein said hollow centrifuge has a diameter ranging from 300mm. to 400mm. and the peripheral wall of which is provided with 10 to 20 superposed rows of orifices therein.

16. An apparatus as set forth in claim 12, wherein said last-mentioned heating means comprises an electric inductive heating coil in a substantially horizontal plane perpendicular to the rotary axis of the centrifuge and below said annular metallic support for inducing heating effects in the latter.

17. An apparatus as set forth in claim 16, including means for energizing said heating coil with alternating electrical currents of medium frequency ranging from 6 kc. to 20 kc.

18. An apparatus as set forth in claim 16, including means for energizing said heating coil with alternating electrical currents of high frequency ranging from 100 kc. to 300 kc.

19. The method set forth in claim 1, including the step of heating the molten material in the course of its lateral flow on said annular surface towards the bottom edge of the internal surface of said lateral wall.

20. An apparatus as set forth in claim 12, wherein said feeding means comprises a circular member at the bottom of said rotary shaft concentric with said annular metallic support for receiving a stream of the molten material dropping downwardly through said hollow shaft and throwing said material centrifugally therefrom onto said annular metallic support for travel towards said peripheral wall.

21. An apparatus as set forth in claim 12, wherein said feeding means comprises an annular channel member supporting the bottom of said rotary shaft inwardly of said annular metallic support, said channel member adapted to receive the stream of molten material along a line displaced from the rotary axis of said centrifuge and scatter it centrifugally onto said annular metallic support for travel towards said peripheral wall.

22. An apparatus as set forth in claim 21, wherein said annular channel member comprises an upstanding annular partition along its inner boundary for preventing the molten material from contacting said hollow rotary shaft.

23. An apparatus as set forth in claim 21, wherein said annular channel member is formed integrally with said annular metallic support.

24. An apparatus as set forth in claim 15, wherein the diameters of the orifices in the peripheral wall diminish from the upper rows to the lower rows.

25. An apparatus as set forth in claim 12, including a partition wall in said centrifuge above said annular metallic support and laterally displaced from said peripheral wall for defining an annular chamber of substantially uniform cross-section for permitting a reserve supply of the molten material to constitute the layer thereof behind all the orifices in said peripheral wall.

26. An apparatus as set forth in claim 25, wherein the spacing of said partition wall from said annular metallic support ranges from 5mm. to 10mm.

27. An apparatus as set forth in claim 25, including an annular lining of insulating material for said partition wall on the face thereof remote from said annular chamber.

* * * * *